United States Patent [19]

Tomaras

[11] Patent Number: 4,663,816

[45] Date of Patent: May 12, 1987

[54] METHOD OF ADJUSTING DISTRIBUTOR PICK-UP COIL

[76] Inventor: Teddy Tomaras, 2561 N. Marwood, River Grove, Ill. 60171

[21] Appl. No.: 777,918

[22] Filed: Sep. 19, 1985

[51] Int. Cl.[4] .......... B23P 7/00; B23P 7/04

[52] U.S. Cl. .......... 29/402.15; 29/407; 29/464; 29/720

[58] Field of Search .......... 29/402.15, 402.01, 402.03, 29/402.09, 402.12, 402.14, 402.08, 402.17, 407, 720, 721, 464, 468, 559, 270, 271; 72/271, 272, 273; 33/80 AT, 80 R, 181 AT; 425/403; 249/175

[56] References Cited

U.S. PATENT DOCUMENTS

| | | | |
|---|---|---|---|
| 331,529 | 12/1885 | Nason | 29/271 |
| 1,758,542 | 5/1930 | Stern . | |
| 1,935,678 | 11/1933 | Valpey . | |
| 1,941,022 | 8/1930 | Shelley . | |
| 2,118,755 | 5/1938 | Bergert | 29/271 |
| 2,860,535 | 11/1958 | Fowler . | |
| 4,025,275 | 5/1977 | Gournelle | 425/403 |

*Primary Examiner*—Mark Rosenbaum
*Assistant Examiner*—Irene Graves Golabi
*Attorney, Agent, or Firm*—Marshall, O'Toole, Gerstein, Murray & Bicknell

[57] ABSTRACT

This disclosure relates to a tool for and a method of adjusting a pick-up coil of a General Motors type engine distributor. The method includes removing the distributor drive shaft and integrally mounted rotor element, mounting a pick-up coil concentric relative to a support bearing for the distributor drive shaft, moving axially inwardly into the opening of the pick-up coil a guide tool having an enlarged cylindrical section between its ends thereof, fixedly securing a magnetic ring in the pick-up coil while the inner end section of the guide tool remains in engagement with the bearing, removing the guide tool, and mounting the distributor drive shaft and the rotor element in the bearing. The guide tool comprises a generally elongated cylindrical body member having a cylindrical inner end section with an outer diameter substantially equal to the outer diameter of the distributor drive shaft, an enlarged diameter cylindrical section extending axially from the outer surface of the end section and the enlarged diameter cylindrical section having an outer diameter substantially equal to the inner diameter of the magnetic ring of the pick-up coil, and an elongated cylindrical handle section.

3 Claims, 4 Drawing Figures

FIG. 1
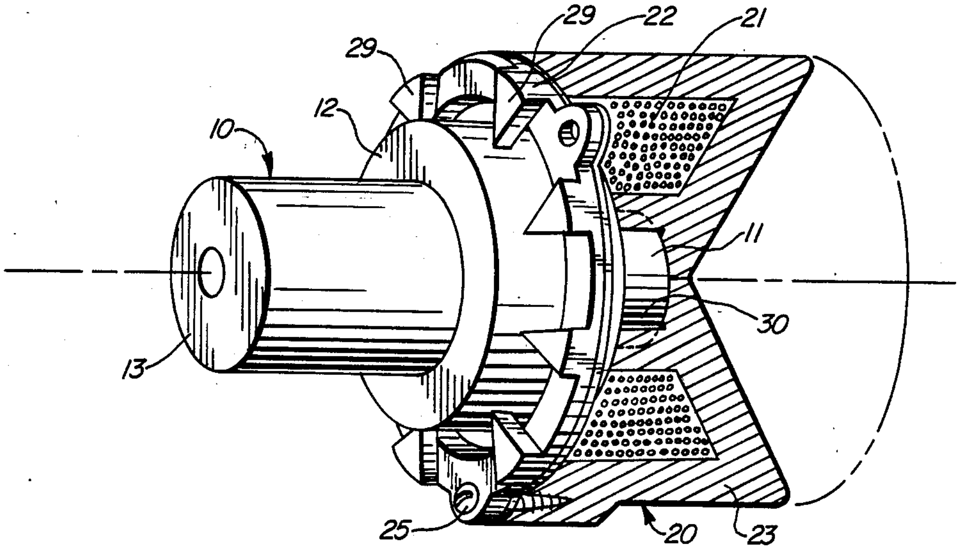
FIG. 2
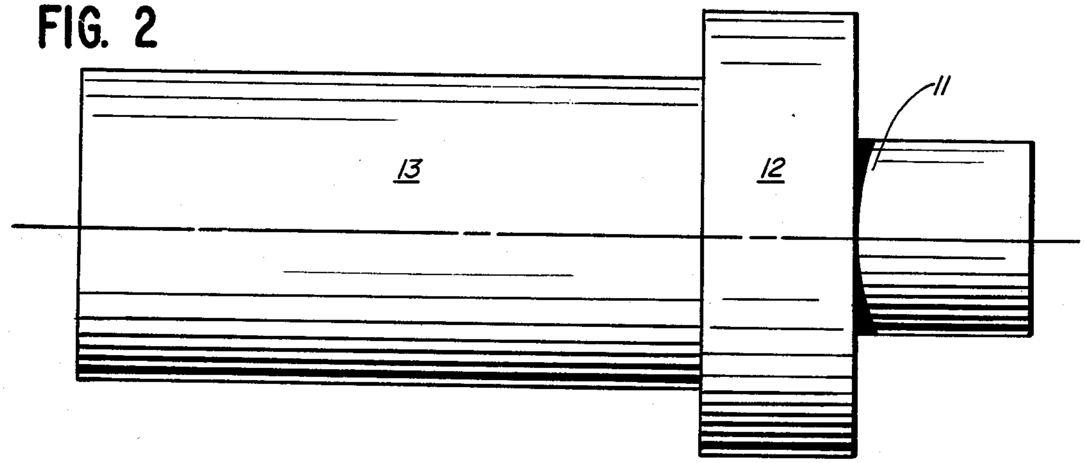
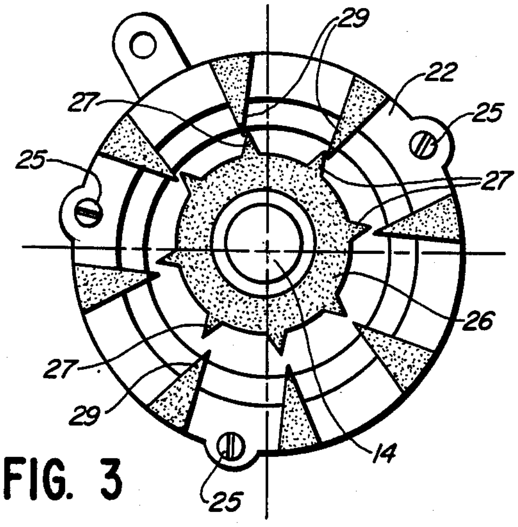
FIG. 3
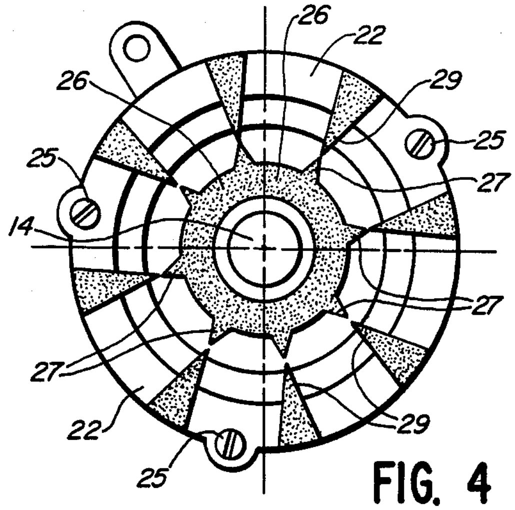
FIG. 4

METHOD OF ADJUSTING DISTRIBUTOR PICK-UP COIL

FIELD AND BACKGROUND OF THE INVENTION

The present invention relates generally to a method of adjusting a pick-up coil of a motor vehicle distributor and a guide tool, and more particularly to a method of centering a magnetic ring of a pick-up coil in a General Motors-type motor vehicle distributor and a centering guide tool used in the method.

A pick-up coil of a motor vehicle distributor, such as a General Motors-type distributor, is a ring-like structure which is removably secured concentrically with the distributor drive shaft within the distributor housing. The pick-up coil comprises an adjustably mounted ring-like magnet having a plurality of spaced teeth or "points" extending radially inwardly toward the axis of the distributor drive shaft. A rotor element concentrically mounted on the distributor drive shaft has a plurality of spaced projections extending radially outwardly toward the magnetic ring. The tips of the "points" of the magnetic ring must lie on the circumference of a circle which is concentric with the axis of the distributor drive shaft, and the circle must have a slightly larger diameter than the outer diameter of the rotor element so that the projections on the rotor element do not contact the magnetic ring and damage the pick-up coil. The magnetic ring is movable transversely in the pick-up coil so that the magnetic ring can be mounted concentrically with the rotor element and distributor drive shaft. When replacing a pick-up coil in a distributor, the magnetic ring of the pick-up coil when initially mounted in a distributor frequently does not align perfectly with the rotor element of the distributor shaft due to variations in the dimensions of the replacement pick-up coil or wear in the bearings of the distributor shaft.

The present method of centering the magnetic ring of a pick-up coil relative to the rotor element in a General Motors-type distributor is essentially by the trial and error "feel" method which requires repeatedly adjusting the magnetic ring in the pick-up coil until the rotor can be freely rotated without contacting any of the "points" of the magnetic ring, a process which can take a great deal of time. When the pick-up coil has a cover plate which prevents the mechanic seeing the magnetic ring and rotor element, the centering process is especially time consuming.

BRIEF SUMMARY OF THE INVENTION

It is, therefore, an object of the present invention to provide an improved method of adjusting a pick-up coil of a General Motors-type motor distributor which is less time consuming and also to provide an inexpensive centering guide tool which facilitates centering the magnetic ring of a pick-up coil relative to the rotor element of a distributor.

BRIEF DESCRIPTION OF THE DRAWINGS

The foregoing objects of the present invention will be apparent from the following detailed description and accompanying drawing wherein:

FIG. 1 is a schematic side elevation view partially in vertical section showing the centering guide tool inserted into the pick-up coil to effect properly centering the magnetic ring; and FIG. 2. is a side elevational view of the centering guide tool of the present invention.

FIG. 3 is a schematic end view showing the pick-up coil magnetic ring improperly centered relative to the rotor element on the shaft of the distributor and causing the rotor element to contact the points of the magentic ring of the pick-up coil;

FIG. 4 is a schematic end view showing the pick-up coil magnetic ring properly centered relative to the rotor element on the shaft of the distributor so the points of the pick-up coil do not contact the rotor element.

DETAILED DESCRIPTION OF THE DRAWINGS

The centering guide tool 10 of the present invention comprises a small diameter cylindrical lower end section 11 having a diameter equal to the diameter of inner end of a distributor shaft 14 and a concentric enlarged cylindrical section 12 extending axially from the outer ends the cylindrical lower end section 11 with an elongated handle section 13 for positioning the sections 11 and 12. The enlarged cylindrical extending axially from the outer surface of the enlarged cylindrical section 12 has a diameter equal to the diameter of the circle defined by the points of the magnetic ring.

In accordance with the present invention the magnetic ring 22 of a ring-like pick-up coil 21 of a General Motors-type distributor 20 is centered in a distributor housing 23 using the above-described centering guide tool 10 by first removing the distributor shaft assembly and mounting a replacement pick-up coil 21 in the housing 23 of the distributor with the mounting screws 25 for the magnetic ring 22 loosened to permit lateral adjustment of the magnetic ring 22 within the pick-up coil. The centering guide tool 10 is inserted from above into the circular opening 28 of the pick-up coil 21 so that the enlarged cylindrical section 12 of the centering tool engages the points 29 of the magnetic ring 22 with all of the points 29 contacting the cylindrical lateral surface of the enlarged section 12 of the guide tool 10. The guide tool 10 is moved laterally until the small diameter end section 11 can be inserted into the distributor shaft support bearing 30 in the distributor housing 23, thereby accurately centering the magnetic ring 22 within the pick-up coil 21 so that the magnetic ring 22 is concentric with the rotor element 26 and the distributor drive shaft 14, thereby permitting the rotor element 26 to be freely rotated within the pick-up coil without the projections 27 contacting any of the points 29 of the magnetic ring 22. The axial length of the small diameter section 11 of the guide tool preferably should be that the enlarged diameter section 12 of the tool will engage the magnetic ring 22 before the small diameter section 11 of the tool can be inserted into the distributor shaft bearing 30. The centering guide tool 10 remains mounted in the distributor shaft bearing 30 until the adjusting screws 25 of the magnetic ring 22 are tightened securely.

The centering guide tool 10 which is suitable for aligning a magnetic ring 22 relative to the points 29 of a distributor pick-up coil 21 of any current model of a General Motors passenger car or the likeas a lower end section 11 which is 19/32 inches long and a diameter of 20/32 inches and is suitable for mounting in the support bearing 30 for the distributor shaft 14. The enlarged cylindrical section 12 extending axially from the outer end of the end section 11 has a length of 16/32 inches and a diameter of 1 and 14/32 inches which duplicates the diameter of the rotor element 26 and the position thereof on the distributor shaft 14. The handle 13 of the tool 10 which extends axially from the outer surface of the cylindrical section 12 typically has a length of about 2 inches and the diameter of about 1 inch, but can be of any convenient length and diameter.

The centering guide tool 10 is preferably made of nonmagnetic material, such as hard nylon plastic, in order to insure dimentional stability and to avoid magnetic attraction between the tool and the magnetic ring interfering with inserting the guide tool 10 into the pick-up coil 21. Also, the lower edges of the small diameter end section 11 and the enlarged cylindrical section 12 of the guide tool 10 can be beveled, to aid in inserting the tool into the distributor shaft bearing 30 and magnetic ring 22, respectively.

I claim:

1. A method of mounting a replacement pick-up coil in a General Motors-type motor vehicle distributor which comprises, removing the distributor drive shaft and integrally mounted rotor element, mounting a pick-up coil carrying a magnetic ring having a plurality of spaced inwardly extending points the inner ends of which lie on the periphery of a circular ring-like opening concentric relative to a support bearing for the distributor drive shaft with the magnetic ring loosely mounted in said pick-up coil for adjustable lateral movement, moving axially inwardly into said ring-like opening of said pick-up coil a guide tool having an enlarged cylindrical section between the ends thereof until said enlarged cylindrical section engages said magnetic ring and said inner end section on said tool forms a mating engagement with the support bearing of the distributor drive shaft, fixedly securing said magnetic ring in said pick-up coil while said inner end section of the guide tool remains in engagement with said bearing and the said points of the magnetic ring engage said cylindrical section of the guide tool, removing said guide tool, and mounting said distributor drive shaft and rotor element in said bearing with said drive shaft and rotor element being freely rotatable within said magnetic ring.

2. A method as in claim 1, wherein said enlarged cylindrical section of said guide tool is moved into engagement with said points of the magnetic ring before said inner end section of said guide tool forms a mating engagement with said support bearing for the distributor drive shaft.

3. A method as in claim 1, wherein said guide tool is made of a nonmagnetic material.

* * * * *